No. 746,047. PATENTED DEC. 8, 1903.
A. R. DODGE.
AUTOMATIC REGULATOR.
APPLICATION FILED AUG. 21, 1902.
NO MODEL. 2 SHEETS—SHEET 2.
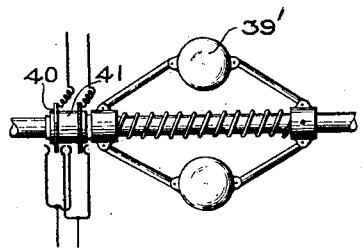
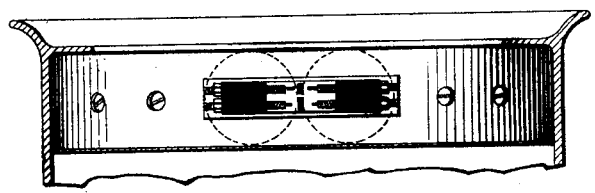
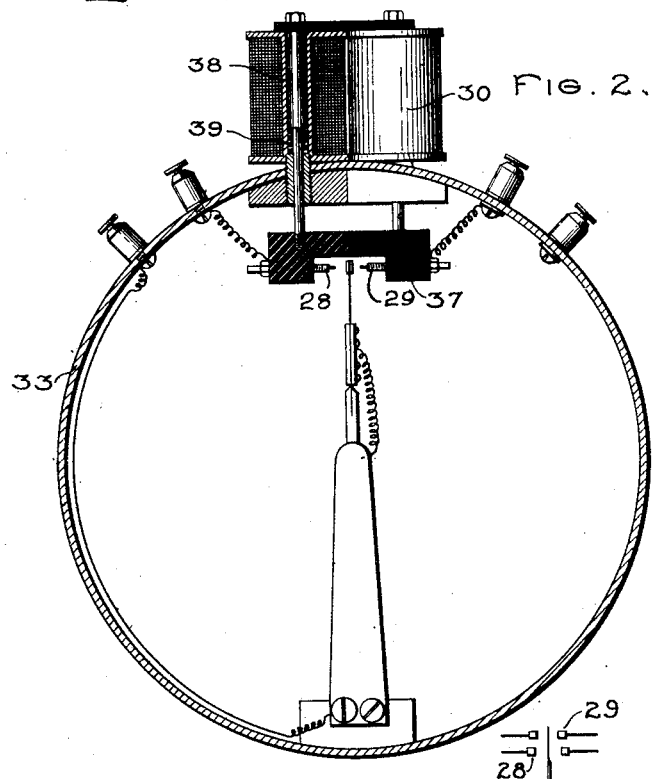
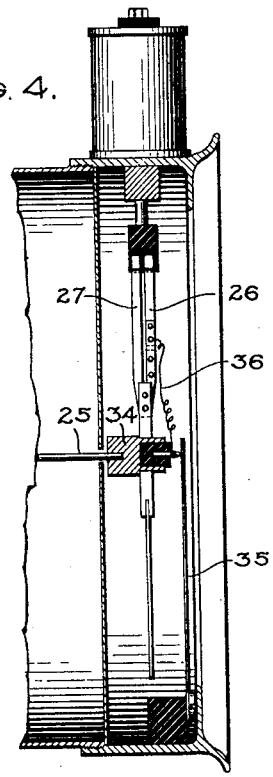
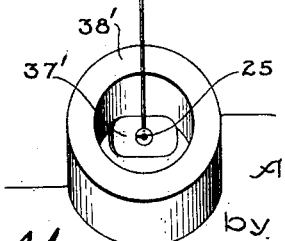
WITNESSES:
H. H. Tilden
Alex F. Macdonald.
INVENTOR:
Austin R. Dodge.
by Albert G. Davis
Atty.

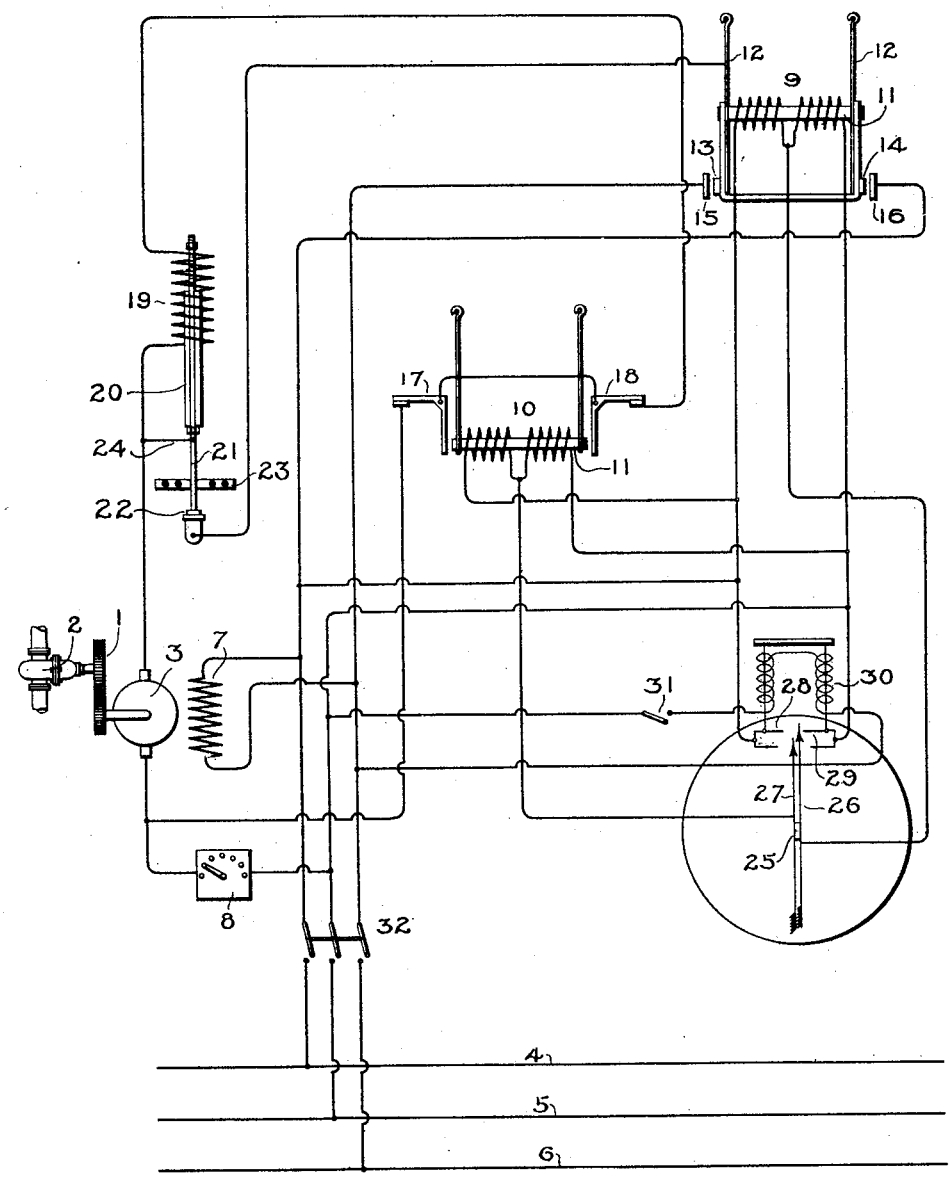

No. 746,047. Patented December 8, 1903.

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

AUTOMATIC REGULATOR.

SPECIFICATION forming part of Letters Patent No. 746,047, dated December 8, 1903.

Application filed August 21, 1902. Serial No. 120,486. (No model.)

*To all whom it may concern:*

Be it known that I, AUSTIN R. DODGE, a citizen of the United States, residing at Schenectady, county of Schenectady, State of New York, have invented certain new and useful Improvements in Automatic Regulators, of which the following is a specification.

In testing steam or other engines it is desirable to maintain a constant pressure for reasons well understood. This is commonly done by employing a man to vary the position of the throttle-valve in the supply-pipe. I have found it difficult to secure a man, particularly in hot weather, who can hold the pressure constant within one per cent. by this means. It is further objectionable in that it increases the cost of testing, which cost is a very considerable factor where a large number of engines are being tested.

The present invention has for its object to provide a regulator which will automatically maintain a constant pressure on the engine or other apparatus under test or which will automatically maintain a constant voltage or current or speed on the system when the regulator is employed in connection with electrical apparatus.

In carrying out my invention an electric motor is provided, which is geared or otherwise connected to the throttle-valve or other device to be actuated. When the motor revolves in one direction, the throttle or other device is opened more or less, and when it revolves in the opposite direction the valve or other device is closed to a greater or less extent. In the case of electrical apparatus the motor is connected to a regulator of suitable character in such manner that the effect on the system or generator is to increase or decrease the current or voltage, as desired. The circuit of the motor is controlled by a pressure-gage or equivalent device, which, acting through electromagnets, starts and stops it at the proper time, suitable means being provided to prevent the motor from overtraveling or "hunting," as it is called. I provide two sets of motor-controlling magnets or devices, one being employed to rectify slight changes in pressure, voltage, or current, the other to rectify material changes. In the present embodiment of my invention the second device is arranged to act on the motor through the first. This is done by rendering the former inoperative until the conditions are approximately normal, after which the first again comes into service. I do not wish to be understood, however, as limiting myself to this precise arrangement, since the second regulating device or one acting to rectify the major variation may act directly on the motor. In order to stop the motor the instant the desired change in condition is effected, a suitable and additional load is applied to the armature.

For a consideration of what I consider to be novel and to be my invention reference is made to the accompanying drawings, specification, and claims appended thereto.

In the drawings, which illustrate my invention in one of its embodiments, Figure 1 is a diagrammatic view of a motor geared to a valve or other regulating device, together with the necessary magnets and controlling devices and circuits. Fig. 2 is a vertical section of a steam-gage with the necessary circuit-controlling contacts. Fig. 3 is a detail view showing the relation between the stationary and moving contacts. Fig. 4 is a partial transverse section of the gage. Fig. 5 is a detail plan view of an electrical instrument arranged to close and open the circuits of the main and auxiliary magnets, and Fig. 6 shows a governor suitable for a water-wheel.

Referring to Fig. 1, 1 represents a controlling device the action of which is to be regulated. In the present illustration a throttle-valve is shown which is situated in the supply-pipe 2 and is operated by the electric motor 3. The pipe may supply steam to an engine or water to a turbine, as desired. The motor should be of such size and so arranged that it can be started into operation in a very brief interval of time. I have found that a motor which will attain full speed in a fraction of a second will give good results. The entire system is actuated by direct current; but it can be operated by alternating current or by a combination of both, as is best adapted to meet the given conditions. Current is supplied by suitable means. In the present instance a three-wire system is used, having conductors 4, 5, and 6. The motor is excited by a field-winding 7 of any suitable character, which is permanently connected in circuit. As shown, the field is connected between the mains 4 and 6. The amount of current supplied to the armature is regulated by the rheostat 8. As shown, the armature is connected between the neutral wire 5 and the outside wires 4 and 6 of the three-wire system. It is adapted to be connected between wires 4 and 5 when motion in one direction is required and between 5 and 6 when motion in the opposite direction is required.

Two controlling-magnets 9 and 10 are provided. The former is employed to rectify slight changes in pressure, voltage, or current, as the case may be, and is the one more constantly in service, and will therefore be hereinafter designated the "main" magnet, while the latter (magnet 10) is only in service when the fluctuations are great and will be hereinafter called the "auxiliary" magnet. It should be noted that both of these magnets are permanently connected in circuit. Each of these magnets is provided with two windings or a single winding with a tap taken out at about the center, which is virtually the same thing. Both of the windings or parts of a winding act upon a common core 11. The core is suspended from two arms 12, which form a parallel motion suspension, and since the winding is divided into two parts when one of said parts is energized the core will be moved to the left and when the other part is energized it will be moved to the right. When both parts are energized, the core will be held in a central position, thus doing away with all springs or centering mechanism. Instead of cutting the sections of the winding into and out of circuit by making and breaking the circuit, which causes arcing, I find it preferable to shunt them by a low resistance, thus obtaining the same effect and preventing destructive arcing. This shunting will be referred to hereinafter.

Mounted on the ends of the arms 12 of the main magnet are contacts 13 and 14, which are electrically connected to one another and to the armature of the motor. Situated opposite the contacts 13 and 14 are other contacts 15 and 16, which are so arranged that when the arms 12 are moved to the extreme right or left the circuit through them will be closed. The contacts are so positioned that when in the position shown the circuit to the motor-armature is open. Contact 15 is connected to the negative side of the system and contact 16 to the positive side. From this it will be seen that when contacts 13 and 15 are closed the armature will rotate backward, and forward when contacts 14 and 16 are closed, assuming the field-winding 7 to be properly connected.

The auxiliary magnet 10 differs very slightly from the main magnet. It is provided with the same kind of winding; but the arms 12 instead of carrying contacts are arranged to engage the bell-crank arms 17 and 18 and cause them to open the circuit of the load-coil, and this without regard to the main magnet. The arms are electrically connected and when in the position shown form a part of a local circuit around the armature. In this local circuit, which when closed forms a load for the motor-armature, is a solenoid-coil 19, that acts on a contact through a lost-motion device. For descriptive purposes this coil will be hereinafter referred to as the "load-coil." The load-coil is provided with a core 20, and passing through it is a rod 21, that actuates a contact 22. The rod is provided with an upper and a lower stop, and when the core is suddenly attracted it hits the upper stop with a blow and opens the supply-circuit to the motor. When the magnet is deënergized and the core drops, it hits the lower stop a blow and seats the contact and closes the supply-circuit of the motor. In order to retard the movements of the contact, friction devices 23 are provided, which engage with the rod 21. The contact is electrically connected to the motor-armature by the wire 24. The load-coil, together with the parts actuated or controlled thereby, constitutes an antihunting device or means for preventing the motor-armature from overtraveling. It is to be noted that the load-coil is directly under the control of the auxiliary magnet and that it is the function of the latter to render the load-coil operative or inoperative, according to the exigencies of the situation. The load-coil is connected in multiple with the armature of the motor and is permanently in circuit therewith, except when the auxiliary magnet 10 interrupts the circuit. In addition to acting as a load or low-resistance shunt or bridge for the armature the load-coil directly controls the armature-circuit through the contact 22. Under normal conditions the armature-circuit remains closed while the core 20 is moved from the lower to the upper stop. The motor must come to rest before the contact 22 can close.

In order to control the action of the main and auxiliary magnets and motor it is necessary to provide some device which is affected directly or indirectly by the medium which is to be controlled. The particular embodiment of my invention which is shown being intended to regulate steam-pressures, a steam gage or indicator is provided having a shaft 25, which shaft owes its movement to changes in steam-pressure. On the shaft are pointers 26 and 27, the former being connected to the center of the main-magnet winding and the latter to the center of the auxiliary-magnet winding. The longer pointer 26 is arranged to engage either the contact 28 or 29. Contact 28 is connected to the left-hand side of the main magnet and contact 29 to the right-hand side of the same magnet. From this it will be seen that when the pointer engages contact 28 the left-hand portion of the coil will be shunted by a low-resistance conductor, thus weakening it, and the core 11 will be pulled to the right. When this takes place, contacts 14 and 16 engage and the motor-armature receives current from the circuit-wires 4 and 5, thus causing it to revolve in a manner to increase the steam-admission to the engine or to increase the voltage or current in case the regulator is intended for such purposes. The contact 28 is so positioned that it will start the motor when the predetermined lower limit is reached. When the pointer 26 moves in the opposite direction and engages contact 29, the right-hand side of the coil will be shunted and the core moved to the left, thus closing the armature circuit on conductors 5 and 6, which causes it to rotate in a manner to reduce the steam-admission or decrease the voltage or current, as the case may be. The contact 29 is so positioned that it will start the motor into operation when the upper limit is reached. I have found it advantageous where the boiler-pressure is one hundred and fifty pounds to set the contacts 28 and 29 so that the pointer will engage the former when the pressure falls off one-fourth of a pound from normal and engages the latter when the pressure increases a quarter of a pound above normal. In other words, the regulator is set to control within one-third of one per cent. The upper contacts 29 are so positioned with respect to the moving pointer 26 that they will complete the circuit a brief interval before the lower set of contacts engages the pointer 27. In Fig. 1 this difference is not especially prominent, as the parts are shown diagrammatically; but it is clearly illustrated in Fig. 3, where the difference in adjustment has been exaggerated to assist in the understanding of the invention. In practice the contacts 28 are given only a very slight lead over each other, and the same is true of contacts 29.

As before stated, the motor is preferably capable of attaining full speed in a fractional part of a second, and as it gets under speed the core 20 in the load-magnet rises. When the core assumes its uppermost position, it strikes the upper stop on the rod 21, causing it to open the armature-supply circuit at 22. The motor now acts as a generator running on a short circuit, and the armature stops instantly, and further movement of the valve or other regulating mechanism is prevented. This action takes place whether the armature is running in one direction or the other.

It sometimes happens that the fluctuation in steam-pressure or other medium to be regulated is a violent one, in which case the pointer 27 will engage the lower portion of either contact 28 or 29. When said engagement takes place, the auxiliary magnet comes into service, and the core engages either the bell-crank arm 17 or 18, as the case may be, and interrupts the circuit of the load-coil 19, so that the circuit through the contact 22, and therefore the motor-armature, remains closed, and the motor is free to move the valve or other regulating device 1. When the conditions are again normal, or nearly so, the short pointer 27 moves away from the contact 28 or 29 and the load-coil circuit is again closed, due to the core of the auxiliary magnet 10 assuming an intermediate position, and the action of the contact 22 and its connecting-circuits as previously described takes place.

The contacts 28 and 29 are so arranged that they may be held out of the path of the pointers 26 and 27, and to bring them into said path a magnet 30 is provided, which is energized from the circuit-wires 5 and 6. A switch 31 is included in the circuit, so that it can be regulated independently of the other circuits. A switch 32 is employed to control all of the circuits leading to the regulator. Referring now to Figs. 2 to 4, inclusive, the structure of a gage which I have found desirable for use will be described. The invention, however, is not limited to any particular form or construction of such a device. 33 represents the casing of a steam-gage or other pressure device having a shaft 25, which is moved by suitable means under the changes in pressure. On the end of the shaft is a support or enlargement 34, to which the pointers 26 and 27 are secured. The pointer 27 is electrically connected to the casing, and the pointer 26 is insulated therefrom. Current is conveyed to the pointer by means of the spring 35, the pivot with which it engages, and the wire 36. The contacts 29 are mounted on an insulating-block 37, and the latter is attached to rods that connect it with the magnet-cores 38. Between the ends of the core and a stationary abutment are compression-springs 39, which tend at all times to move the contacts 29 upward and out of the path of the pointers. When the solenoid-magnet 30 is energized, the cores are attracted and the contacts 29 brought into operative position with respect to the pointers.

In Fig. 5 I have shown a pointer-carrying shaft 25, which is actuated by an armature 37', the latter being situated within the influence of a field-magnet 38'. The structure of the armature and magnet is that of the well-known Thomson inclined-coil instruments, and it can be arranged to operate on constant-current or constant-potential circuits, as desired. The torque of such a device should be adjusted so that it will cause the moving and stationary contacts to make good electrical connection. It can be relayed or not, as desired.

When my improved regulator is arranged for use on water-wheels and the like, a fly-ball governor of usual construction can be substituted for the pressure-gage or its equivalent, the electrically-actuated indicator. Mounted on the shaft of the water-wheel is a fly-ball governor 39', arranged to actuate the contacts 40. The contacts take the form of rings and are carried by the sleeve 41. The wires leading from the magnets terminate in brushes which make frictional contact with the contacts 40 on the revolving sleeve. The brushes and contacts are so related that the circuits of the main magnet 9 are first closed and later the circuits of the auxiliary magnet 10. It will thus be seen that the operation of the regulator is the same as that previously described.

In accordance with the provisions of the patent statutes I have described the principle of operation of my invention, together with the application which I now consider to represent the best embodiment thereof; but I desire to have it understood that the apparatus shown is only illustrative and that the invention can be carried out by other and equivalent means.

What I claim as new, and desire to secure by Letters Patent of the United States, is—

1. In combination, a motor, a magnet for closing the motor-circuit, an antihunting device, and automatically-acting means for rendering the antihunting device inoperative under certain conditions of operation.

2. In combination, a controller, a motor for actuating the controller, an antihunting device for the motor, and means acting automatically to render the antihunting device inoperative.

3. In combination, a controller, a motor for actuating the controller, an antihunting device, a means for rendering the antihunting device inoperative, and a device which is responsive to changes in that which is being controlled for starting the said means into operation.

4. In combination, a controller having a plurality of operative positions, a motor for adjusting the controller to any one of its said positions, an antihunting device which is normally in operative relation to the motor, and a magnetic means acting under abnormal conditions for rendering the antihunting device inoperative.

5. In combination, a motor, a magnet for closing the motor-circuit, a coil in circuit with the motor which acts through a lost-motion device to open the motor-circuit, and an auxiliary magnet which comes into play under abnormal conditions and prevents the first-named coil from operating.

6. In combination, a motor, contacts for closing the motor-circuit in a manner to induce movement in one direction, contacts for closing the motor-circuit in a manner to produce movement in the opposite direction, an antihunting device which operates without regard to the direction of movement of the motor, and a means acting automatically to render the antihunting device inoperative.

7. In combination, a controller, a motor for actuating the controller, contacts for closing the motor-circuit, a means for opening the motor-circuit which is independent of said contacts, and a device for rendering the means inoperative.

8. In combination, a controller, a motor for actuating it, contacts for closing the motor-circuit, a magnet for interrupting the circuit at a point between the motor and the contacts, and a switch for opening the circuit of the magnet under abnormal conditions.

9. In combination, a controller, a motor for actuating it, a switch for closing the motor-circuit, a contact for opening the circuit at a point between the motor and the switch, a magnet for operating the switch, and a lost-motion connection between the magnet and the contact.

10. In combination, a motor, a magnet having a divided winding, contacts for shunting a portion of the winding, and a contact which is actuated by the magnet for closing the motor-circuit.

11. In combination, a motor, a magnet for closing the circuit thereof, a contact independent of the magnet and connected to the motor-circuit, and a second magnet arranged to move the contact and open the magnet-circuit.

12. In combination, a motor, a main magnet which controls the motor under normal conditions, an auxiliary magnet which controls the motor under abnormal conditions, and an automatic means which first closes the circuit of one magnet and then the next.

13. In combination, a motor, a main magnet which controls the motor under normal conditions, an auxiliary magnet which controls the motor under abnormal conditions, and a load-magnet which is in service while the main magnet is controlling and is out of service when the auxiliary magnet is controlling.

14. In a regulator, the combination of a magnet having a winding, contacts for cutting the winding into and out of service, means actuated by a change in condition of a fluid for actuating the contacts, a core extending through the magnet, and a parallel-motion device for supporting the core at points on opposite sides of the magnet, whereby the core will normally occupy a central position.

15. In a regulator, the combination of a magnet having a divided winding, a switch for cutting one portion or the other of the winding out of service, a core for the magnet, a parallel-motion support for the core which brings it to a central position, and contacts situated at opposite ends of the core and controlled thereby.

16. In a regulator, the combination of a magnet having a divided winding, conductors for permanently connecting the magnet to the circuit-wires, low-resistance shunts for bridging one portion of the winding or the other to render it inoperative, a core for the magnet, and contacts acted upon by the core.

17. In combination, a motor, a magnet for coupling the motor to an electric circuit, a load-magnet which is connected in multiple with the motor-armature, a contact for making and breaking the motor-circuit, and a lost-motion connection between the magnet-core and the contact, whereby the motor-armature is permitted to attain a certain speed before its circuit is interrupted.

18. In combination, a motor, a main magnet for controlling its circuit, an auxiliary magnet also arranged to control the motor-circuit, and a moving contact device which first closes the circuit of one magnet and then the other.

19. In combination, a motor, a main magnet for controlling its circuit, an auxiliary magnet also arranged to control the motor-circuit, a moving contact device which first closes the circuit of one magnet and then the other, a moving contact, a contact which is normally stationary, the contacts being arranged to close the circuit of first one magnet and then the other, and means for moving the stationary contact out of the path of the moving contact.

20. In combination, a motor, main and auxiliary magnets which are permanently connected to the circuit in multiple, moving and stationary contacts for weakening the magnets, an indicator which effects the weakening of one magnet or the other, and a load-magnet which acts on the motor-armature and is itself controlled by the auxiliary magnet.

21. In an indicator, the combination of a pointer, a contact carried thereby, and a magnet and spring mutually acting on the contact in a manner to move the contact into or out of the path of the pointer.

22. In an indicator, the combination of a pointer, contacts carried thereby, a movable support to which two sets of contacts are affixed, one of said sets being given a slight lead over the other, and a magnet for moving the contact-support.

23. In combination, a dynamo-electric machine, a coil which is connected to the armature-circuit and is arranged to form a load therefor, and a contact for interrupting the supply of current to the armature which is controlled by the load-coil.

24. In combination, a dynamo-electric machine with a coil which is arranged to interrupt the supply of current to the armature and also to act as a load when the supply-circuit is interrupted.

25. In combination, a dynamo-electric machine, an armature-circuit, a load-coil which is permanently connected to the armature, and mechanism operated by the load-coil for opening and closing the armature-circuit.

In witness whereof I have hereunto set my hand this 6th day of August, 1902.

AUSTIN R. DODGE.

Witnesses:
   BENJAMIN B. HULL,
   JOS. N. L. ENDRES.